BENJAMIN W. COLLIER.

Improvement in Baling Cotton, &c.

No. 125,721.            Patented April 16, 1872.

Witnesses:           Inventor:

UNITED STATES PATENT OFFICE.

BENJAMIN W. COLLIER, OF OXFORD, ASSIGNOR TO HIMSELF AND W. H. FORD, OF VAIDEN, MISSISSIPPI.

IMPROVEMENT IN BALING COTTON, &c.

Specification forming part of Letters Patent No. 125,721, dated April 16, 1872.

Specification describing a new and useful Improvement in Baling Cotton, &c., invented by BENJAMIN W. COLLIER, of Oxford, in the county of La Fayette and State of Mississippi.

Figure 1:
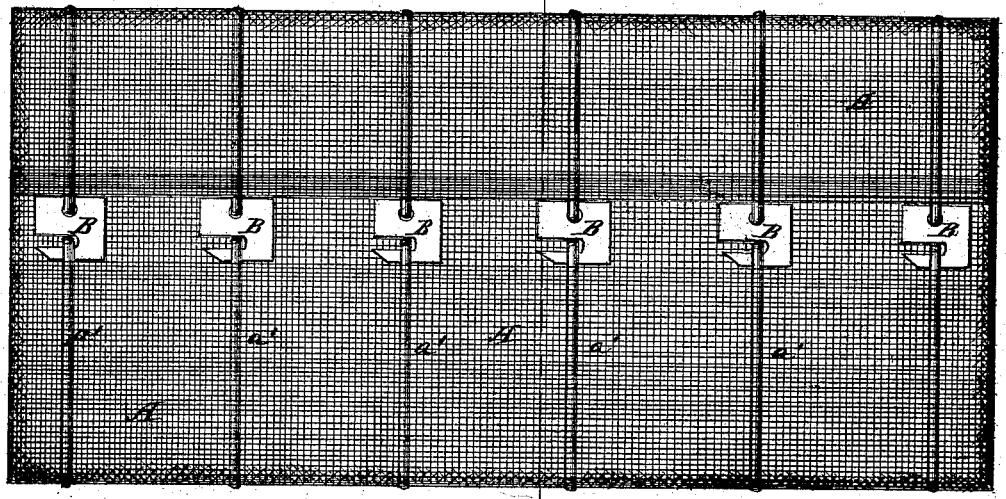
Figure 2:
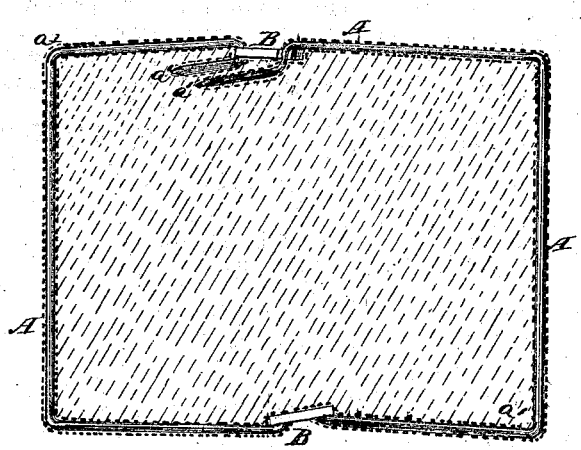

Figure 1 is a side view of a cotton-bale illustrating my invention. Fig. 2 is a detail cross-section of the same.

Similar letters of reference indicate corresponding parts.

My invention has for its object to furnish an improvement in baling cotton, hay, and other substances suitable to be put up in bales, which shall be simple, inexpensive, and secure, protecting the substance baled better from thieves, fire, animals, &c., than when baled in the ordinary manner, and which shall be equally applicable to loose and compressed bales; and it consists in the wire baling-cloth, and in the manner of securing it upon the bales, as hereinafter more fully described.

A is the baling-cloth, which is made of fine wire of sufficient strength to hold the cotton or other substance securely without ties. In the wire-cloth A, at suitable distances apart, are larger wires, $a'$, as shown in Figs. 1 and 2. The wire-cloth A may be secured upon the bale by locking the ends of the coarser wires $a'$ into each other; but in the case of compressed bales this will not answer. In this case I prefer to use metallic hooks or buckles, B, which are secured to one end of the coarser wires $a'$, and are hooked upon said wires, as shown in Figs. 1 and 2. With this fastening when the bales are compressed the hooks or buckles B are unhooked and hooked around the wires $a'$ further down. In this case there should be a set of hooks, B, upon each side of the bale, as shown in Fig. 2. When the wire-cloth A is woven without the coarser wires $a'$ it may be secured upon the bale by sewing with wire or twine. The wire-cloth A, at the ends of the bale, is secured by sewing with wire or twine.

Having thus described my invention, I claim as new and desire to secure by Letters Patent—

1. The improved cotton-baling herein described, the same being formed of wire-cloth, as set forth.

2. The coarser wires $a'$ woven into the wire baling-cloth A to furnish a means for securing said cloth upon the bale, substantially as herein shown and described.

3. The hooks or buckles B, in combination with the coarser wires $a'$ and wire-cloth A, substantially as herein shown and described, and for the purpose set forth.

BENJAMIN W. COLLIER.

Witnesses:
E. HUSTON,
H. C. BUFORD.